United States Patent [19]

Yamagishi et al.

[11] Patent Number: 4,879,636

[45] Date of Patent: Nov. 7, 1989

[54] PROJECTOR-TYPE HEAD LAMP FOR VEHICLES

[75] Inventors: Hirofumi Yamagishi, Isehara; Tooru Segoshi, Yokohama; Kouji Shigemura; Yutaka Nakata, both of Isehara; Hirokazu Yoneyama, Hiratsuka; Mototsugu Yamashita, deceased, late of Atsugi, all of Japan, by Takemi Yamashita, heir

[73] Assignees: Nissan Motor Company, Yokohama; Ichikoh Industries, Tokyo, both of Japan

[21] Appl. No.: 207,815

[22] Filed: Jun. 17, 1988

[30] Foreign Application Priority Data

Jun. 17, 1987 [JP] Japan ............................... 62-149236

[51] Int. Cl.4 ............................................ B60Q 1/04

[52] U.S. Cl. ....................................... 362/61; 362/80; 362/263

[58] Field of Search ............................ 362/61, 80, 263

[56] References Cited

U.S. PATENT DOCUMENTS

| | | | |
|---|---|---|---|
| 4,669,032 | 5/1987 | Lietar et al. | 362/61 |
| 4,677,532 | 6/1987 | Peitz et al. | 362/61 |
| 4,686,610 | 8/1987 | Cibié et al. | 362/61 |
| 4,722,039 | 1/1988 | Gaugel | 362/263 |
| 4,727,458 | 2/1988 | Droste et al. | 362/61 |
| 4,731,713 | 3/1988 | Perthus | 362/61 |
| 4,754,373 | 6/1988 | Otto et al. | 362/263 |
| 4,774,636 | 9/1988 | Gaugel et al. | 362/263 |

FOREIGN PATENT DOCUMENTS

| | | | |
|---|---|---|---|
| 3241713 | 5/1984 | Fed. Rep. of Germany | 362/66 |

*Primary Examiner*—Ira S. Lazarus
*Assistant Examiner*—Sue Hagarman
*Attorney, Agent, or Firm*—Foley & Lardner, Schwartz, Jeffery, Schwaab, Mack, Blumenthal & Evans

[57] ABSTRACT

In the projector-type head lamp for vehicles according to the present invention, a discharge lamp having a single color temperature is disposed at one of the foci of the inside reflective surface of a predetermined geometrical shape. There is disposed at the other focus of the inside reflective surface a shade intended to shape the reflected light beam from the inside reflective surface. The light beam having been shaped into an appropriate shape by the shade is condensed and projected frontward through the lens. Since the light source is a discharge lamp having a single color temperature, these light beams cause no dispersion by the lens. Therefore, no colored zone is produced near the dark area of the luminous intensity distribution pattern projected frontward, that is located along the light-dark limit defined as the result of the cutting by the shade of the light beams.

4 Claims, 4 Drawing Sheets

PROJECTOR-TYPE HEAD LAMP FOR VEHICLES

BACKGROUND OF THE INVENTION (a) Field of the Invention

The present invention relates to a projector-type head lamp for use on vehicles, and more particularly to a projector-type head lamp with which no colored light zone will appear near the light-dark limit of a luminous intensity distribution pattern formed by a light beam projected after shaped into an appropriate form by a shade disposed between a light source and a convex lens.

(b) Description of the Prior Art

Generally, the head lamps of a car are required to brightly illuminate the lane surface in front of the car in a luminous intensity distribution pattern which will not dazzle the driver of a car running on the opposite lane. To meet these requirements, the so-called projector-type head lamps have been proposed as a head lamp of which the optical system is simple and which can be designed compact as a whole. The optical system of one example of such head lamps of projector type is schematically shown in FIG. 1. Generally, the projector-type head lamp comprises a reflector 10 of which the inside reflective surface may be shaped in any of many different geometrical forms, for example, a spheroidal form. There is disposed an incandescent lamp 12 having a filament 14 positioned at the inner focus Fl of the reflector 10, and a shade 16 is disposed near the outer focus F2 to shape into an appropriate form the light reflected by the reflective surface. Also there is disposed a convex lens 18 having a focal plane i-j with which the outer focus F2 of the reflector 10 coincides. The light emitted from the light source is reflected by the reflector 10 and incident upon the outer focus F2 of the reflector 10 where it is shaped by the shade 16. The shade 16 has the top thereof cut as shown in FIG. 2 (cut line indicated with the reference number 20). The light incident upon the shade 16 is shaped as partially blocked, and the light thus shaped is projected frontward through the convex lens 18. The luminous intensity distribution pattern on a screen disposed in a position about 10 meters from the light source is shown in the form of an isolux curve in FIG. 4. With such a conventional protector-type head lamp, the light incident upon the convex lens 18 outgoes generally horizontally as considered from the standpoint of geometrical optics, but since the light source is a coiled tungsten filament, the light is not a light of single wavelength in practice. Hence, a phenomenon takes place that light beams different in wavelength from one another and incident upon the convex lens 18 are refracted in different directions depending upon their respective wavelengths. This is called a "dispersion". This light dispersion will be described with reference to FIG. 3. Among the light beams incident upon the upper portion of the convex lens 18, those of large wavelengths (lights going toward red) are refracted upward with respect to the horizontal direction, while the light beams of small wavelengths (lights going toward purple) are refracted downward with respect to the horizontal direction. Of the light beams incident upon the lower portion of the convex lens 18, those of large wavelengths are refracted downward with respect to the horizontal direction, while the light beams of small wavelengths are refracted upward with respect to the horizontal direction. With such a projector-type head lamp, as an influence due to the above-mentioned dispersion appears within a dark area 24 along a light-dark limit 22 defined by the cut line 20 of the shade 16, namely, since a colored light appears above the light-dark limit 22, an iridescent zone develops within the dark area 24. This phenomenon is caused by the light components refracted upwardly with respect to the horizontal direction, rather than by the light components refracted downwardly with respect to the horizontal direction. To reduce such dispersion, a so-called composite lens structure may be adopted, but this is not economic because its manufacturing costs are high. Further, in the conventional projector-type head lamps, the filament as light source is an axial or longitudinal coil which will cause an uneven brightness distribution in which zones of maximum and minimum brightness appear alternately. Also, the luminous intensity distribution pattern is influenced by such uneven brightness distribution.

In the case of a reflector in which the inside reflective surface is spheroidal and employed in a projector-type head lamp, the luminous intensity distribution pattern resulted from the converging of the light emitted from the filament and reflected by the reflective surface takes a peanut-like form, that is, the central upper and lower portions of the pattern are concave downward and upward, respectively. As shown in FIG. 4, the luminous intensity ,distribution pattern projected through the convex lens after being shaped by the shade also has the central lower portion thereof still remained concave. So, an improved optical system is needed to provide an ideal luminous intensity distribution pattern.

SUMMARY OF THE INVENTION

The present invention seeks to provide a projector-type head lamp adopting a simple optical system capable of providing an ideal luminous intensity distribution pattern.

According to another object of the present invention, a projector-type head lamp is provided with which an iridescent zone developed near the light-dark limit of a luminous intensity pattern projected frontward can be eliminated.

According to a still another object of the present invention, a projector-type head lamp is provided with which the bright zone of a projected luminous intensity distribution pattern is not influenced by any brightness distribution of the light source.

These and other objects and advantages of the present invention will be better understood from the ensuing description made, by way of example, of the embodiment according to the present invention with reference t the drawings.

BRIEF DESCRIPTION OF THE DRAWINGS

FIGS. 5 thru 7 show one embodiment of the projector-type head lamp according to the present invention, in which FIG. 5 is a schematic front view of the optical system;

FIG. 6 is a schematic side elevation of the optical system shown in FIG. 5; and

FIG. 7 is a schematic luminous intensity distribution pattern intended for explanation of the shape of reflected light pattern on a screen disposed in the place of the shade.

DETAILED DESCRIPTION OF THE PREFERRED EMBODIMENT

Figure 1:
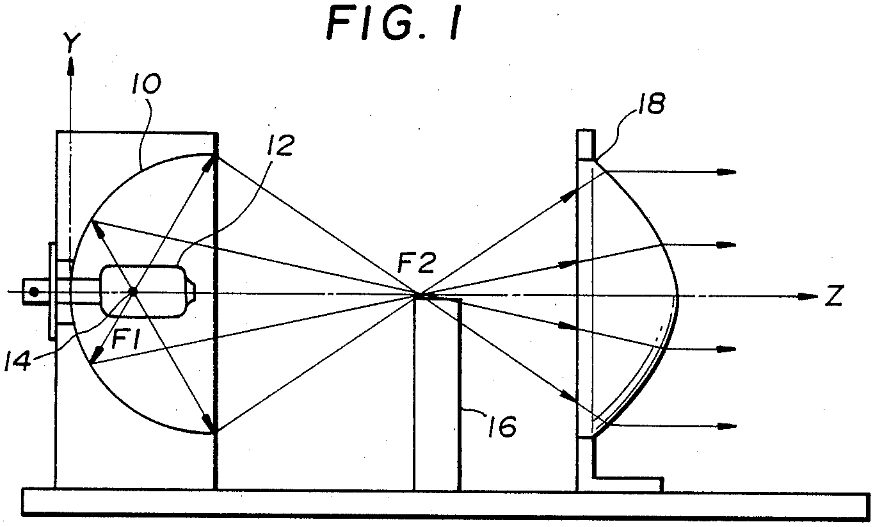
FIG. 1 is a schematic front view of the optical system of a conventional protector-type head lamp.
Figure 2:
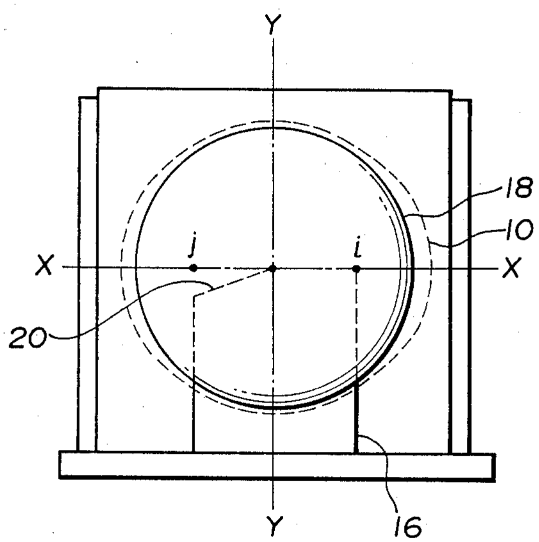
FIG. 2 is a side elevation of the optical system shown in FIG. 1.
Figure 3:
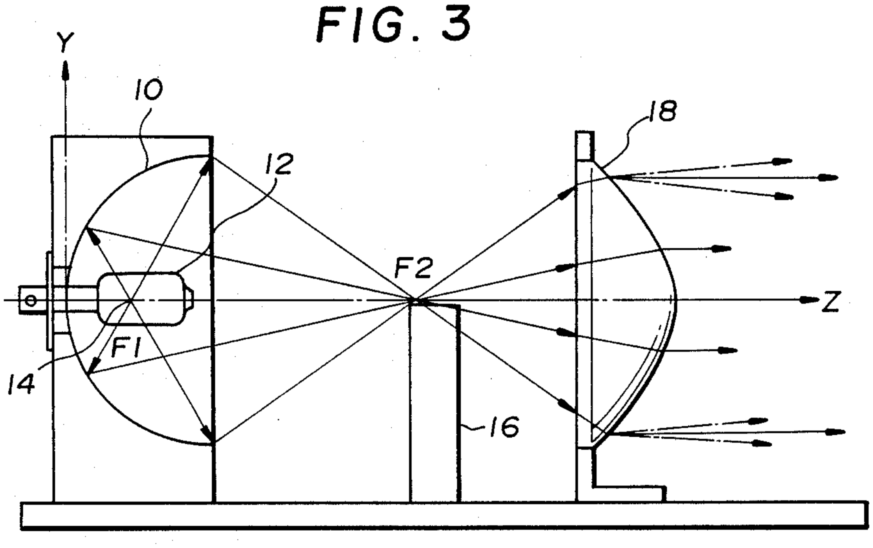
FIG. 3 is a drawing intended for explanation of the dispersion through the convex lens in the optical system.
Figure 4:
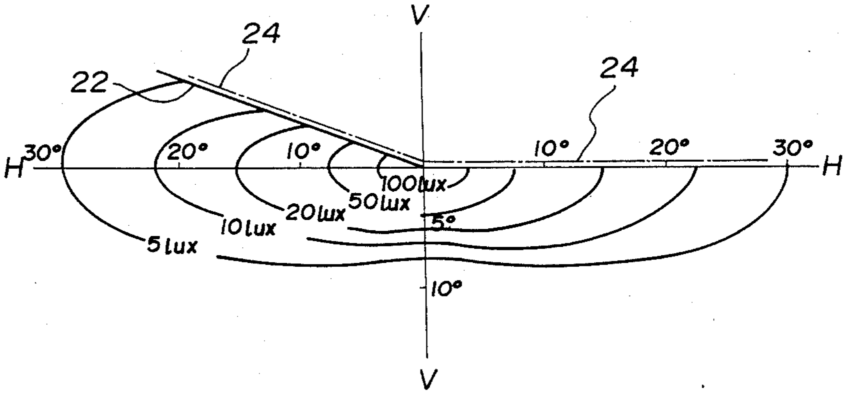
FIG. 4 is an isolux curve intended for explanation of the influence of the dispersion through the convex lens on the luminous intensity distribution pattern projected frontward.
Figure 5:
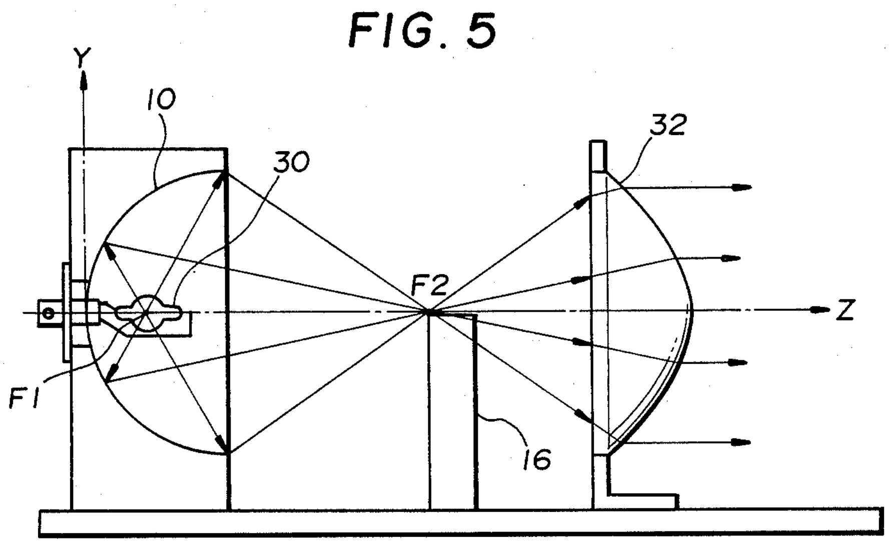

FIG. 5 schematically shows the optical system of the projector-type head lamp according to the present invention. The protector-type head lamp according to the present invention differs in the following respects from the conventional projector-type head lamp. Namely, The light source adopted is not a linear filament of which the brightness distribution is discrete, but a discharge lamp 30 of which the brightness distribution is spatially continuous. The convex lens 32 is a single lens. The present invention requires no composite lens. The discharge lamp 30 is well known per se, has a higher luminous efficacy and a longer life than the incandescent lamp, however, the discharge lamp is not used in the ordinary lamp units for vehicles. In the embodiment of the protector-type head lamp according to the present invention, the discharge lamp 30 adopted is a metal halide lamp of 35 W which is energized by battery. The metal halide lamp is disposed with the intermediate point between the anode and cathode of the metal halide lamp being nearly coincident with the inner focus F1 of a reflector 10 of which the inside reflective surface is a spheroidal one, and a shade 16 is disposed near the outer focus F2 of the reflector 10. A single lens 32 used in the head lamp has a generally flat incident surface at the side facing the reflector 10 and a convex outgoing surface at the side away from the reflector 10. The lens 32 has a focal plane located as nearly coincident with the outer focus F2 of the reflector 10. The light emitting tube of the metal halide lamp is charged with mercury and a metal halide which are evaporated when heated with a preheater (not shown). There is a gap of about 5 mm between the anode and cathode. When a high voltage pulse from a DC source, that is, a battery, is applied between the anode and cathode, a DC discharge is made between the anode and cathode and a generally uniform light source is provided of which the brightness distribution takes a spatially continuous football-shaped pattern formed around the mid point between the anode and cathode. This light source 30 is a monochromic one of 4,000 K in color temperature, and has no continuous spectrum as the incandescent lamp. So, use of a single lens 32 as convex lens will not cause any colored light zone near the light-dark limit of the luminous intensity distribution pattern.

Figure 6:
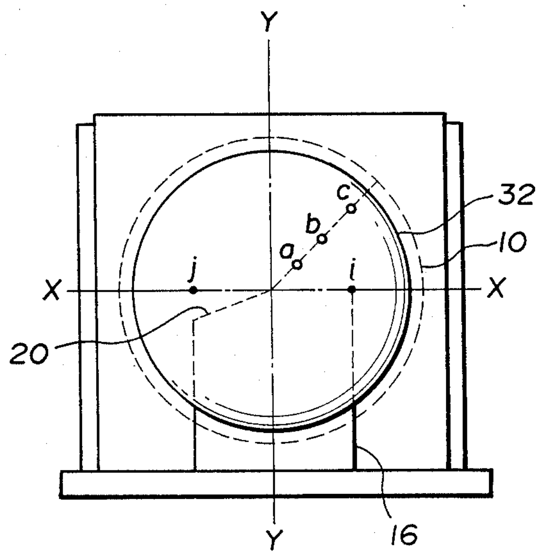
Figure 7:
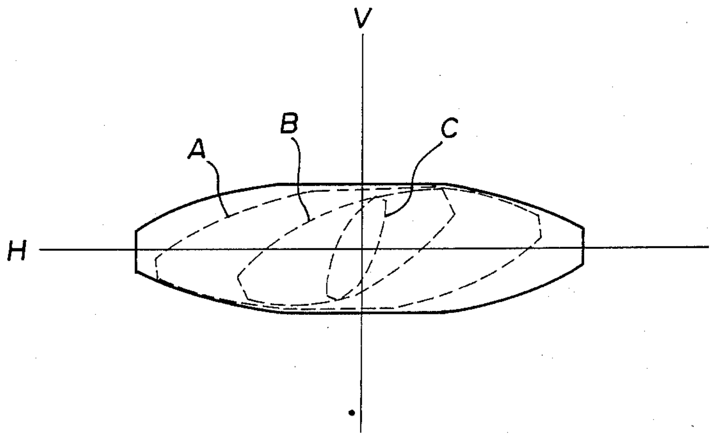

The light beams reflected at the points a, b and c on the reflective surface of the reflector 10, as shown in FIG. 6, produce, on a screen disposed near the shade 16, patterns indicated with dash lines A, B and C, respectively, as shown in FIG. 7. It will be thus apparent that the pattern composed of light beams reflected on the entire reflective surface takes the form of a football as shown in FIG. 7. This pattern has the features that the central upper and lower portions of the pattern are not concave as in the case where a filament is disposed in a reflector of which the inside reflective surface is spheroidal. Namely, the pattern does not take the form of a peanut, but a football shape of which the top and bottom are nearly flat. In other words, the pattern is essentially elliptical but has substantially parallel top and bottom portions and substantially parallel end portions. Thus, the light beam shaped by the shade 16 and projected through the convex lens 32 produces an ideal luminous intensity distribution pattern with no dark concave portion at the central lower portion thereof.

A metal halide lamp is used as discharge lamp in this embodiment, but a sodium lamp or high pressure mercury lamp may be used instead.

In the embodiment having been described in the foregoing, the reflector 10 used has a spheroidal inside reflective surface, but the inside reflective surface is not limited to this geometrical shape. Of course, the reflector 10 may be a one which has an inside reflective surface of any one of various geometrical shapes which can be adopted in the conventional projector-type head lamps.

The present invention employs the standard shade 16 of conventional projection-type head lamps. As discussed in the background of the invention, shade 16 is disposed near the outer focus F2 to shape light reflected by reflective surface 10 into an appropriate form. Also there is disposed a convex lens 32 having a focal plane i-j with which the outer focus 32 of the reflector 10 coincides. The light emitted from the light source is reflected by the reflector 10 and incident upon the outer focus F2 of the reflector 10 where it is shaped by the shade 16. The shade 16 has the top thereof cut as shown in FIG. 6 (cut line indicated with the reference number 20.) The light incident upon the shade 16 is shaped as partially blocked, and the light thus shaped is projected frontward through the convex lens 32.

What is claimed is:

1. A projector-type head lamp for vehicles, comprising:

a reflector having an inside reflector surface of a predetermined geometrical shape and provided with a light source at one of the foci thereof;

a shade disposed near the other focus of said reflector and which is intended to shape the light beam reflected at said inside reflective surface; and a lens means of converging the light beam shaped by said shade and having a focal plane near the other focus of said reflector;

said light source being a discharge lamp having a single temperature with a spatially continuous brightness distribution.

2. A projector-type head lamp according to claim 1, in which the intermediate point between the anode and cathode of said discharge lamp is disposed at said one focus of said reflector and whose brightness distribution has a substantially elliptical shape.

3. A projector-type head lamp according to claim 1, said lens means being a single lens.

4. A projector-type head lamp according to claim 2, said discharge lamp being a metal halide lamp.

* * * * *